(12) United States Patent
Haveman

(10) Patent No.: US 9,822,508 B2
(45) Date of Patent: Nov. 21, 2017

(54) BUCKET ARTICULATED RAKE ATTACHMENT

(71) Applicant: Justin Haveman, Kalispell, MT (US)

(72) Inventor: Justin Haveman, Kalispell, MT (US)

( * ) Notice: Subject to any disclaimer, the term of this patent is extended or adjusted under 35 U.S.C. 154(b) by 169 days.

(21) Appl. No.: 14/300,218

(22) Filed: Jun. 9, 2014

(65) Prior Publication Data

US 2015/0354166 A1    Dec. 10, 2015

(51) Int. Cl.
*E02F 3/96* (2006.01)
*A01B 43/00* (2006.01)
*E02F 3/40* (2006.01)

(52) U.S. Cl.
CPC .............. *E02F 3/962* (2013.01); *A01B 43/00* (2013.01); *E02F 3/404* (2013.01)

(58) Field of Classification Search
CPC . E02F 3/40; E02F 3/404; E02F 3/3405; E02F 3/402; E02F 3/962; A01B 43/00
USPC ........... 37/403–410, 444; 414/722–724, 912; 56/400.14, 400.2, 400.21; 172/329, 332, 172/345, 349–351, 355, 365, 371–373, 172/375
See application file for complete search history.

(56) References Cited

U.S. PATENT DOCUMENTS

| | | | | |
|---|---|---|---|---|
| 2,705,082 A * | 3/1955 | Heimsoth | .......... | A01D 87/0053 37/405 |
| 2,718,074 A * | 9/1955 | Bartlett | ............... | E02F 3/3405 37/417 |
| 2,768,760 A * | 10/1956 | Pilch | .................. | B65G 65/00 414/698 |
| 3,033,394 A * | 5/1962 | Kashergen | .............. | E02F 3/345 172/247 |
| 3,455,477 A * | 7/1969 | Blair | ................... | A01D 87/003 414/704 |
| 3,515,221 A * | 6/1970 | Fowler | ................. | A01B 31/00 172/445.2 |
| 3,807,802 A * | 4/1974 | Betters | .................. | E04G 23/08 173/100 |
| 4,055,007 A * | 10/1977 | Johnson | ................. | E02F 3/407 37/431 |
| 4,061,194 A * | 12/1977 | McCanse | ............... | E02F 3/844 172/260.5 |
| 4,187,049 A * | 2/1980 | Jones | ..................... | E02F 3/404 414/704 |
| 4,863,338 A * | 9/1989 | Johnson | ................. | E02F 3/404 414/704 |
| 7,913,431 B1 * | 3/2011 | Beam | .................... | A01G 23/06 37/406 |
| 7,926,583 B2 * | 4/2011 | Newnam | .................. | E02F 3/76 172/447 |

(Continued)

*Primary Examiner* — Robert Pezzuto
*Assistant Examiner* — Jessica H Lutz
(74) *Attorney, Agent, or Firm* — Law Office of Craig Bohn; Craig E. Bohn

(57) ABSTRACT

An articulated rake assembly attachable to an excavating vehicle having a bucket. The rake assembly has a rake mechanism adapted and constructed to retain material having a certain size. A reciprocating mechanism operationally connects the rake mechanism to the bucket of the vehicle, and is adapted and constructed to selectively reciprocate the rake mechanism with respect to the bucket, thereby selectively retaining material. The rake mechanism configurable to have either or both a push orientation and a gather orientation.

10 Claims, 5 Drawing Sheets

(56) References Cited

U.S. PATENT DOCUMENTS

2008/0110651 A1\* 5/2008 Stubben .................. E02F 3/764
                                                                          172/781
2011/0100882 A1\* 5/2011 Beam ...................... B07B 1/005
                                                                          209/252

\* cited by examiner

BUCKET ARTICULATED RAKE ATTACHMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention generally relates to attachments for a frontend loader bucket, and specifically to rake attachments attachable to the bucket of a skidsteer vehicle and the like.

2. Description of the Related Art

Excavating and materials handling vehicles have evolved enormously from the steam shovel of the late nineteenth century. From giant diesel-powered earth movers used in mining operations to trenchers applied to laying irrigation line, there is a vehicle for almost every job no matter its size or nature. Among the most ubiquitous and versatile excavating vehicle is the so-called "skidsteer" vehicle. Its compact size and maneuverability make it indispensable on the jobsite. Further, a variety of attachments are available to accomplish myriad tasks.

Not surprisingly, a variety of attachments have been devised for skidsteer, and other excavating vehicles. For example, U.S. Pat. No. 3,967,397 to Nault is directed to a back hoe or tractor attachment for material handling apparatus. The attachment is used with a main frame and a swing frame pivotally mounted on said main frame for lateral and vertical swinging movement thereon. The attachment comprises a first member pivotally mounted on said swing frame; a rake is operatively mounted on said first member and a cable or chain is connected, on the one hand, to the free end of the first member and, on the other hand, to the swing frame, so that the first member is pivotally connected at one end to the swing frame and is suspended at the other end from the swing frame when the back hoe or tractor is in operation.

U.S. Pat. No. 6,357,993 to Burton deals with skid-steer loader implement having a hydraulically actuated grapple component that includes an implement having first and second spaced apart pivot support structures and a hydraulically actuated grapple component pivotally secured to the second pivot support structure. A hydraulically actuated cylinder has one end of the cylinder pivotally secured to the first pivot support structure of the implement and is provided with a moveable piston integrally coupled to an output actuation rod that is pivotally secured at an end remote from the piston to the grapple component. The hydraulically actuated cylinder has supply/return ports adjacent the ends of the cylinder adapted to be alternately coupled to a high pressure hydraulic fluid supply or low pressure hydraulic fluid return. The hydraulically actuated cylinder has valve structure to hydraulically cushion movement of the piston and associated actuation rod as the piston moves past a supply/return port prior to being physically stopped at the ends of the cylinder. The actuation rod is provided with a protective shield to protect the actuation rod surface from hostile environmental intrusions by objects in the vicinity of the actuation rod during actuation. The grapple component includes a pivot shaft portion that is at least as wide as, or wider than, a grapple tooth end of the grapple component. The second pivot support structure is comprised of a pair of bearing support elements spaced apart such that a grapple pivot shaft portion cooperates therewith to create a physical barrier to any material thing that may be gripped between the grapple component and implement.

U.S. Pat. No. 6,223,828 to Paulson shows a landscape rake including a rotatably operable rake mechanism for performing a raking function, a bucket for receiving material raked by the rake mechanism, and a fluid actuator connected to the rake mechanism operable for moving the rake mechanism relative to the bucket. The fluid actuator has a first port adapted for connection to a source of pressurized fluid for receiving the pressurized fluid therefrom for moving the rake mechanism to a position proximal to the bucket and a second port adapted for connection via a fluid path to a fluid receiver for discharging fluid thereto. A fluid control system for the fluid actuator includes a second fluid path connecting the first port of the fluid actuator with the first named fluid path and a valve disposed in the second fluid path operable for allowing fluid flow therethrough from the first port to the first named fluid path while preventing fluid flow from the first named fluid path to the first port to allow the rake mechanism to float when in the position proximal to the bucket.

U.S. Pat. No. 4,372,063 to Work concerns a brush clearing apparatus for a bulldozer blade. A rake is pivotally mounted on the blade for movement about an axis along the upper edge of the blade between an operational position in which the rake engages the bulldozing face of the blade and a retracted position above the blade. A clamp is pivotally mounted on the blade for movement about the axis between a lowered position engaging the rake oppositely of the blade when the rake is in the operational position. Teeth individual to the rake and to the clamp extend in intermeshing relation adjacent to the lower edge of the blade when the clamp is in the lowered position. A hydraulic ram mounted on the blade for moving the rake between its positions. The apparatus includes an element for connecting the rake and the clamp so that raising the clamp to its upper position carries the rake into its retracted position and the blade is usable as if the apparatus were not mounted.

Unfortunately, none of the above approaches provides a mechanism to selectively place and retain material in a bucket of a skid steer vehicle. For most applications, the only technique for getting material, especially relatively small, residual quantities of material, into the bucket is to drive the vehicle, so that the bucket pushes the material against a wall or other stationary object, thus sliding the material over the leading edge of the bucket. This practice is not only inefficient and ineffective, but also risks damage to the bucket and to the object against which it is driven. Additionally, it would be a valuable addition to the art to have a mechanism that easily attaches to the bucket, so that the bucket does not need to be removed to employ a rake attachment. Additionally, it would be desirable to provide for selectable canting of the rake attachment with the mechanism's principle hydraulic ram.

It can be seen from the foregoing that the need exists for simple, inexpensive rake assembly that overcomes the difficulties of known systems.

BRIEF DESCRIPTION OF THE DRAWINGS

The invention will be explained in conjunction with an illustrative embodiment shown in the accompanying drawings.

DESCRIPTION OF THE ILLUSTRATED EMBODIMENT

Figure 1:
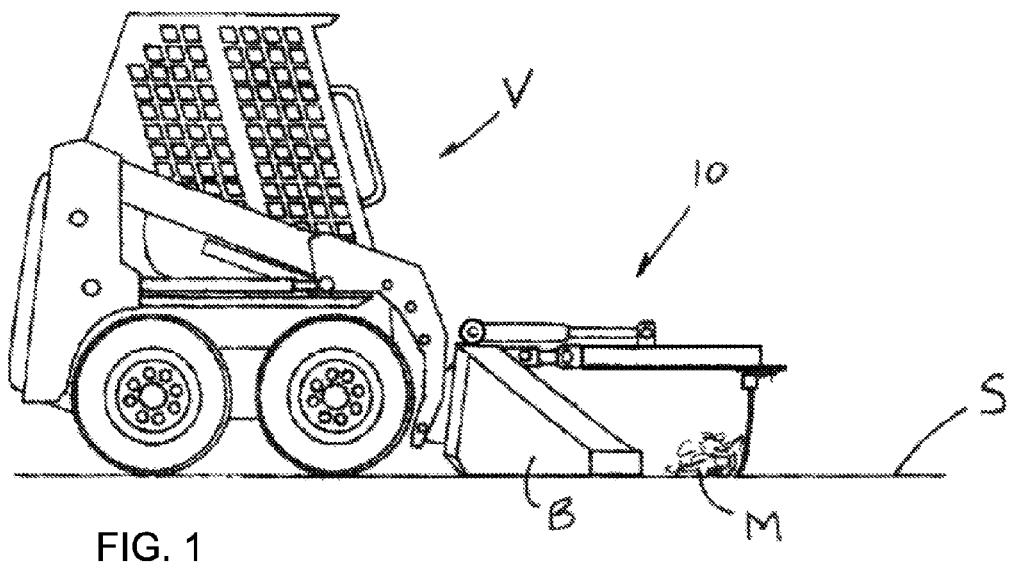
FIG. 1 is a schematic side elevational view of an exemplary embodiment of a rake assembly in accordance with the principles of the present invention attached to a vehicle.
Figure 2:
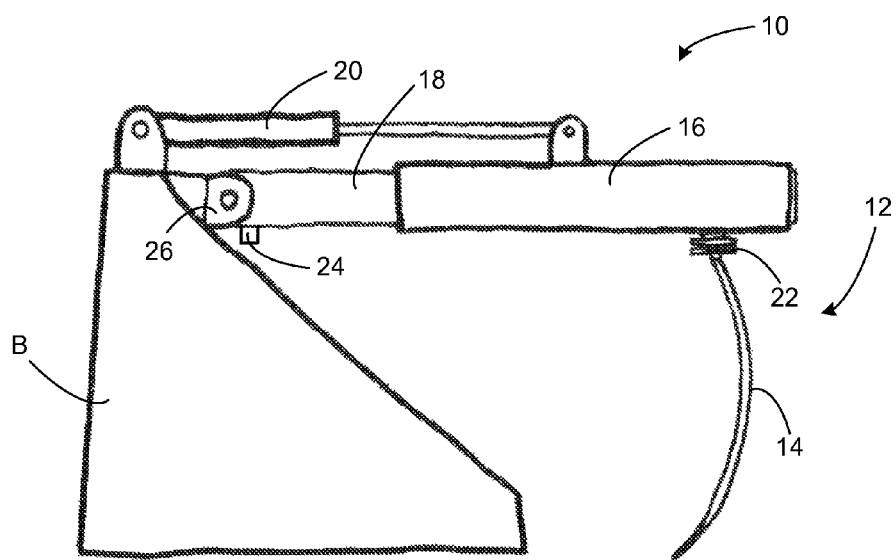
FIG. 2 a schematic side elevational view of an exemplary embodiment of a rake assembly in an extended position, attached to a vehicle bucket.
Figure 3:
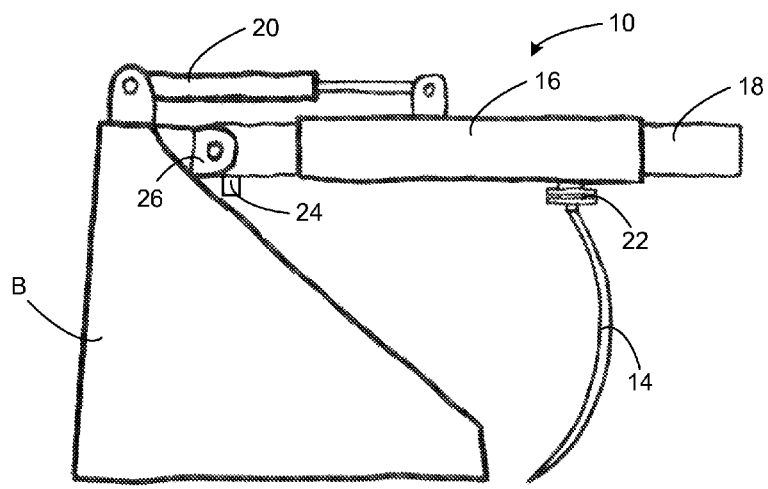
FIG. 3 a schematic side elevational view of an exemplary embodiment of a rake assembly in a semi-refracted position, attached to a vehicle bucket.

Now, referring to FIG. 1, an exemplary embodiment of a boom rake assembly 10 is shown attached to the bucket B of a typical skidsteer vehicle V. The boom rake assembly 10 is shown employed to gather material M on the work surface S. As will become evident, an exemplary embodiment boom rake assembly 10 may be configured to push material M into a collection point on work surface S. The exemplary embodiment may also be used on other vehicle types that employ loader buckets, which may be referred to, among other things, as a bucket loader or frontend loader. The exemplary embodiment may be fixedly or removably attachable to the bucket. As such, an attachment bracket for the boom rake assembly 10 may be rigidly welded to the top of the bucket. Alternatively, a securement bracket may be welded to or formed in the bucket such that the boom rake assembly 10 may be boltable onto the securement bracket. Once attached, the boom rake assembly 10 is selectively positionable out of the opening of the bucket, and permits full use of the bucket in a conventional manner, reducing the need to remove the boom rake assembly 10.

Referring now to FIGS. 2 through 5, an exemplary embodiment of a boom rake assembly 10 is shown to have a rake bar 12, having a tine bar 52 and a plurality of tines 14. The boom rake assembly 10 also has a slide arm 16 and a static arm 18. Exemplary slide arm 16 is configured to be moveable along a length of static arm 18 by a hydraulic ram 20. Exemplary tines 14 are attached to the slide arm 16 by pivot 22. In an exemplary embodiment, tines 14 are removably attachable to a tine bar 52. Appropriate tines 14 may be selectable from an assortment of commercially available tines, and individually replaceable. Exemplary tine bar 52 is fixedly attached to pivot 22. Exemplary tines 14 are oriented to curve out, away from, and then point back toward, the direction of desired movement of material M. Exemplary pivot 22 is selectively fixed in a position to maintain tine bar 52 in a perpendicular position to slide arm 16.

Figure 4:
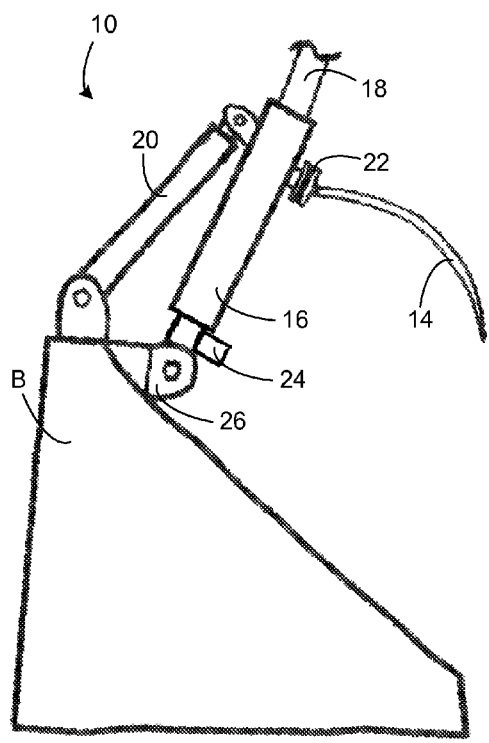
FIG. 4 a schematic side elevational view of an exemplary embodiment of a rake assembly in an elevated position, attached to a vehicle bucket.
Figure 5:
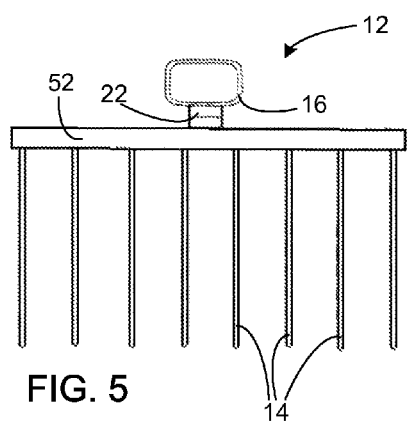
FIG. 5 is a front elevational view of an exemplary tine sub-assembly.

Exemplary slide arm 16 is shown to be constructed out of a hollow steel sleeve that may be slid coaxially over the exterior of static arm 18. A bi-directional hydraulic ram 20 can be selectively extended and retracted to modify the position of slide arm 16 along static arm 18. In the exemplary embodiment, an exemplary cant anchor 24 is mounted to the side of the static arm 18, near the arm mounting bracket 26. Exemplary cant anchor 24 is rigidly positioned to protrude below static arm 18, so as to interrupt the slide path of slide arm 16. In this fashion, the cant anchor 24 performs as a travel stop element. In operation, when slide arm 16 is retracted along static arm 18 by hydraulic ram 20, slide arm 16 contacts the travel stop, which is the exemplary cant anchor 24. Additional retraction of hydraulic ram 20 causes boom rake assembly 10 to pivot upward at arm mounting bracket 26, to raise boom rake assembly 10 away from the work surface S, as shown in FIG. 4, independent of the movement of bucket B.

In operation, independent of the movement of vehicle V, exemplary boom rake assembly 10 may be extended to locate rake bar 12 distal to bucket B, in order to reach past material M on work surface S. Boom rake assembly 10 may then be retracted to locate rake bar 12 proximal to bucket B, and in so doing gather material M into bucket B. Further retraction of boom rake assembly 10 raises tines 14 off work surface S. In so doing, tines 14 are raised above the floor of bucket B, in which position tines 14 no longer obstruct the opening of bucket B. Bucket B may then be raised and dumped, to selectively deposit material M in a chosen location.

Figure 6:
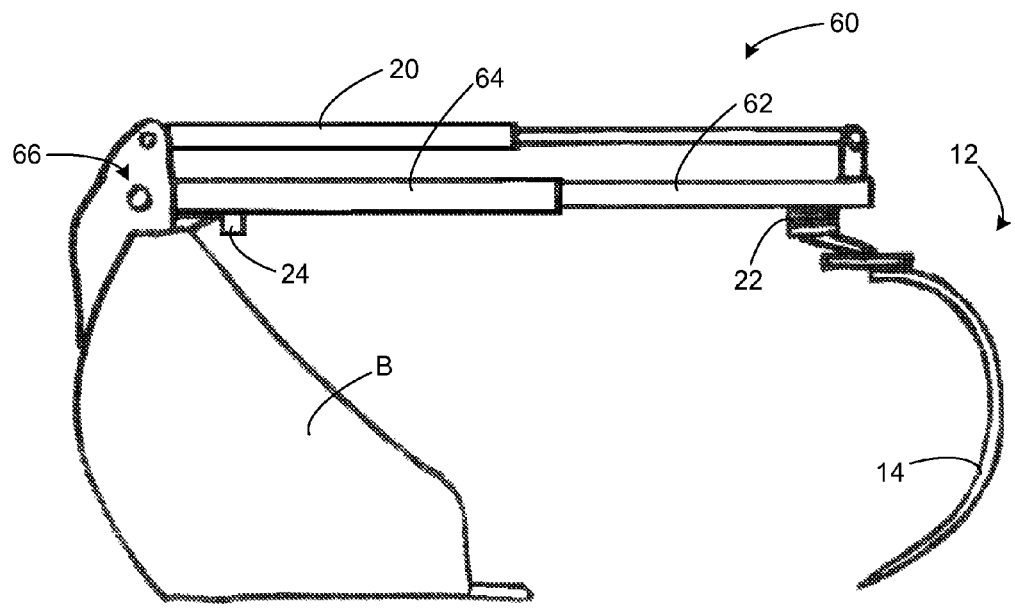
FIG. 6 is a schematic side elevational view of an alternate exemplary embodiment of a rake assembly in an extended position, attached to a vehicle bucket.
Figure 7:
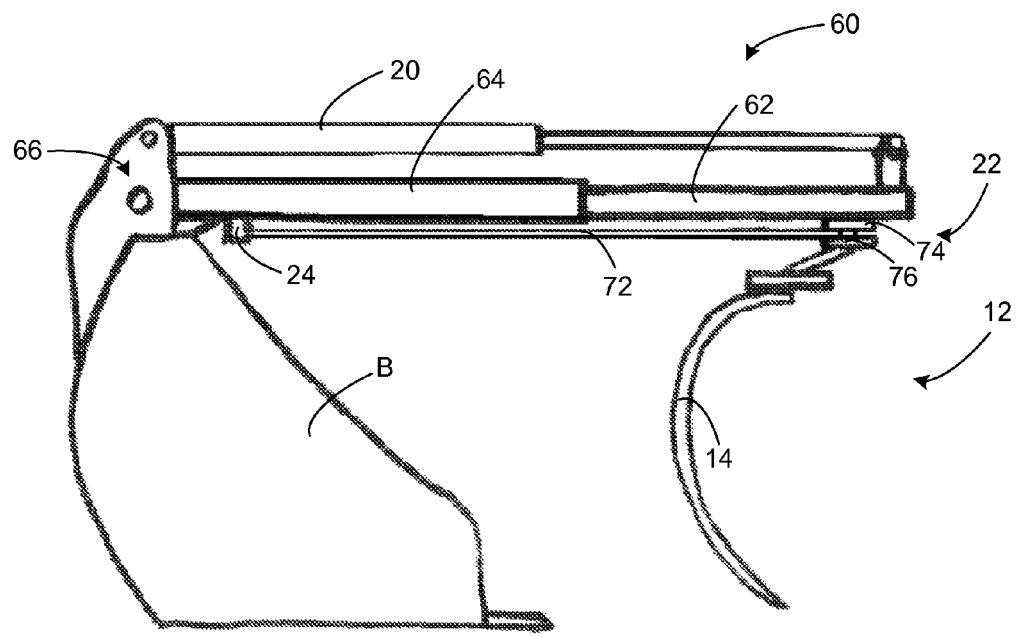
FIG. 7 is a schematic side elevational view of an alternate exemplary embodiment of a rake assembly in a push orientation, attached to a vehicle bucket.

Referring now to FIGS. 6 and 7, an alternate exemplary embodiment of boom rake assembly 60 is shown where alternate slide arm 62 fits coaxially into the hollow body of alternate static arm 64. Exemplary alternate slide arm 62 is configured to be moveable along a length of exemplary alternate static arm 64 by a hydraulic ram 20. As in the previous embodiment, a bi-directional hydraulic ram 20 can be selectively extended and retracted to modify the position of alternate slide arm 16 within alternate static arm 18. In operation, alternate slide arm 62 may be retracted within alternate static arm 64 by hydraulic ram 20 to a point where alternate static arm 64 contacts pivot 22. Additional retraction of hydraulic ram 20 causes alternate boom rake assembly 60 to pivot upward at mounting point 66, to raise away from the work surface S (not shown), independent of the movement of bucket B.

Figure 8:
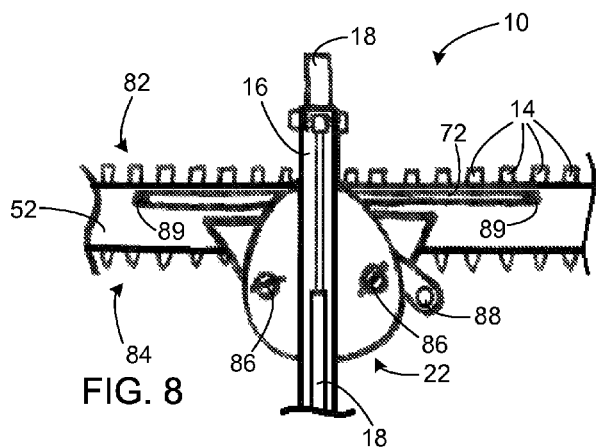
FIG. 8 is a plan view of an exemplary embodiment of a rake assembly in a gather orientation.

Referring now to FIG. 8, an exemplary boom arm rake assembly 10 is shown in a fixed gather orientation, where tines 14 functionally point toward the bucket B. Exemplary tine backs 82 are shown oriented away from bucket B, and tine points 84 are oriented toward bucket B. The exemplary tine bar 52 is locked in position relative to the longitudinal axis of the slide arm 16. An exemplary fix pin 86 is shown in pivot 22 to perform the lock function. A cant lever 88, not engaged in this configuration, may be seen to protrude form a side of pivot 22. A cant arm 72 is shown in a stowed position on tine bar 52, secured between a set of stow pins 89.

Figure 11:
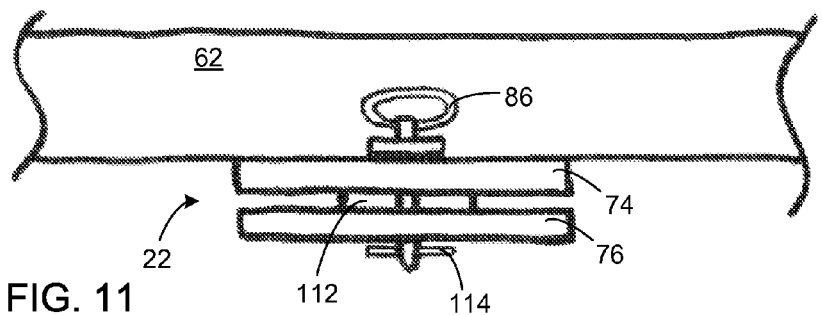
FIG. 11 is a sectional side view of an exemplary embodiment a pivot assembly.

In FIG. 7, and additionally referring to FIG. 11, alternate boom rake assembly 60 is shown in a push orientation, where tines 14 functionally point away from the bucket B. Pivot 22 may be released from a fixed position to permit tine bar 52 to be rotated with respect to the longitudinal axis of the slide arm 16. Exemplary cotter pin 114 is removable from fix pin 86, to permit fix pin 86 to be removed from pivot 22. Pivot 22 has a pivot stator 74 that is fixedly attached to slide arm 16, and a pivot rotor 76 that is selectively rotatable with respect to pivot stator 74. Removal of fix pin 86 permits pivot rotor 76 to rotate with respect to pivot stator 74 on bearing 112, and thereby relates to a corresponding pivot of rake bar 12 with respect to slide arm 16.

Figure 12:
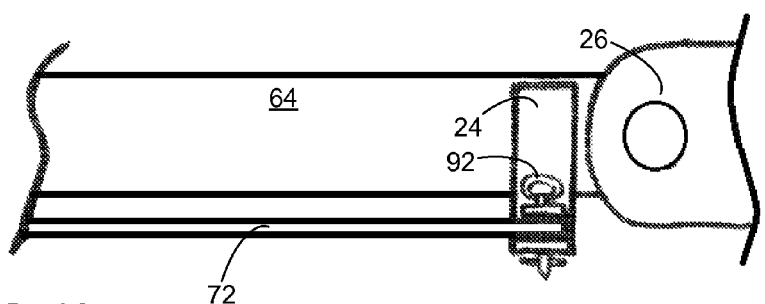
FIG. 12 is a sectional side view of an exemplary embodiment a cant arm and cant anchor assembly.
Figure 13:
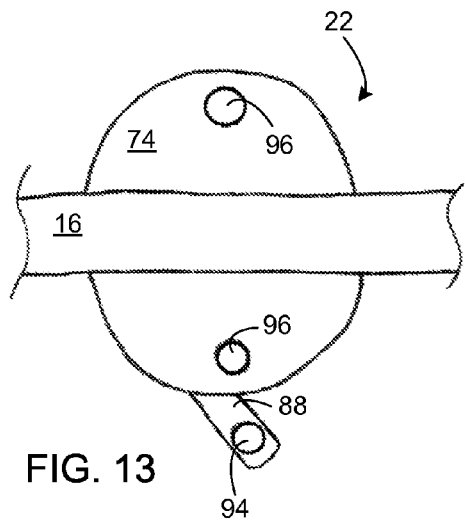
FIG. 13 is a sectional plan view of an exemplary embodiment of a pivot assembly.
Figure 14:
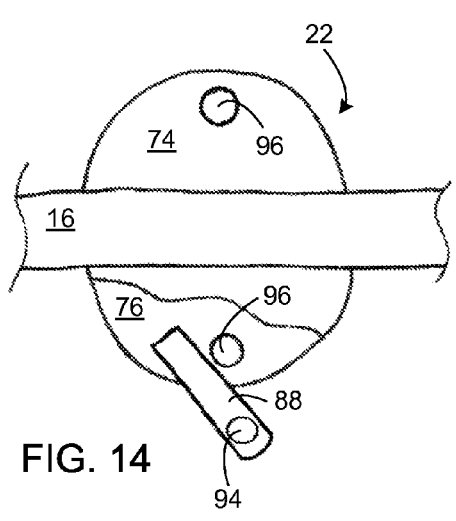
FIG. 14 is a partially cut-away sectional plan view of the exemplary embodiment of the pivot assembly of FIG. 13.

Referring now also to FIGS. 12 through 14, an exemplary cant arm 72 is shown connectable between pivot 22, and cant anchor 24. Exemplary pivot 22 may have a cant lever 88 rigidly attached to rotor 76 on the side corresponding to cant anchor 24. Exemplary cant arm 72 may be secured to the cant anchor 24 with cant anchor attachment 92. Exemplary cant arm 72 may be pivotably secured to pivot 22 at cant lever attachment 94. Removal of a fix pin 86 from one or more pivot holes 96 permits freedom of rotation between pivot stator 74 and pivot rotor 76, such that the rake bar 12 may pivot with respect to the longitudinal axis of slide arm 16.

Figure 9:
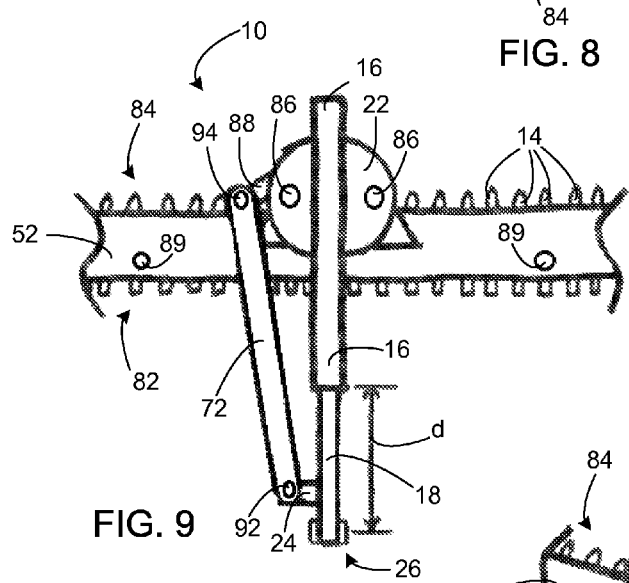
FIG. 9 is a partially cut-away plan view of an exemplary embodiment of a rake assembly in a push orientation.
Figure 10:
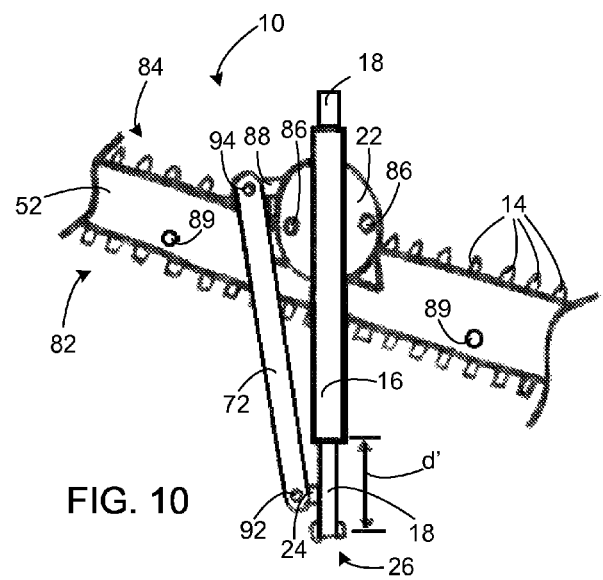
FIG. 10 is a partially cut-away plan view of an exemplary embodiment of a rake assembly in a canted push orientation.

As will be now described, a small degree of rotation between pivot stator 74 and pivot rotor 76 will result in a corresponding cant angle between slide arm 16 and tine bar 52. Referring now to FIGS. 9 and 10, an exemplary boom arm rake assembly 10 is shown in a push orientation and canted push orientation, respectively. Exemplary fix pins 88 are removed from pivot holes 96. Exemplary rigid cant bar 72 is removed from the stow position, and secured between cant anchor 24 and cant lever 88. So configured, slight retraction of slide arm 16, such as to reduce a distance d, between the proximate edge of slide arm 16 and arm mounting bracket 26, to a slightly shorter distance d', will apply force to cant arm 88, causing rotation between pivot rotor 76 and pivot stator 74. (The hydraulic ram 20 is cut-away and not shown, but understood to exist, to make the illustration less cluttered.) In the exemplary embodiment, rotation between pivot rotor 76 and pivot stator 74 imparts a similar relative rotation between tine bar 52, which is rigidly attached to pivot rotor 76, and slide arm 16, which is rigidly attached to pivot stator 74.

Though not shown, a similar, but opposite slight extension of slide arm 16 would impart rotation between the pivot stator 74 and pivot rotor 76 in the opposite direction. Such opposite rotation would cause a correspondingly similar opposite cant in tine bar 52, with respect to slide arm 16.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents, since the provided exemplary embodiments are only examples of how the invention may be employed, and are not exhaustive.

I claim:

1. A rake apparatus configured to attach to a bucket of an excavating vehicle, the bucket having a bucket opening, comprising:
a static arm and a slide arm;
the slide arm moveable along a length of the static arm from a position distal to the bucket to a position proximal to the bucket;
a rake bar attached to the slide arm at a rake-arm attachment point;
the rake bar extending outwardly in at least one direction from the rake-arm attachment point;
the rake apparatus attachable to the bucket at a bucket-arm attachment point;
the bucket-arm attachment point permitting the rake apparatus to pivot outwardly from the bucket opening;
a single actuator operationally connected to the slide arm to controllably move the slide arm along a length of the static arm between a position distal to the bucket and a position proximal to the bucket; and
the rake-arm attachment point comprising a pivot at which the rake bar may be selectively fixed and pivoted with regard to the longitudinal axis of the slide arm.

2. The apparatus of claim 1 further comprising:
a cant arm operationally linked to the rake bar such that movement of the slide arm along a length of the static arm effects rotation of the rake bar at the pivot.

3. The apparatus of claim 1 further comprising:
the pivot comprising a pivot stator and a pivot rotor;
a cant lever extending outwardly from the pivot rotor and away from the slide arm;
a cant anchor fixedly attached to the static arm distal the pivot; and
a cant arm having a fixed length, and operationally connectable between the cant anchor and the cant lever.

4. The apparatus of claim 2 further comprising:
the pivot comprising a pivot stator and a pivot rotor;
a cant lever extending outwardly from the pivot rotor and away from the slide arm;
a cant anchor fixedly attached to the static arm distal the pivot; and
a cant arm having a fixed length, and connectable between the cant anchor and the cant lever.

5. The apparatus of claim 1 wherein:
the rake bar comprising an elongated tine bar with a plurality of tines positioned along the length of said tine bar.

6. The apparatus of claim 5 further comprising:
the plurality of tines extending outwardly from a rake bar side opposite the slide arm.

7. An excavating bucket attachment device comprising:
a static arm and a slide arm;
the slide arm moveable along a length of the static arm from a position distal to the bucket to a position proximal to the bucket;
a hydraulic ram operationally connected to the slide arm to effect motion of the slide arm with respect to the static arm;
a rake bar attached to the slide arm at a rake-arm attachment point;
the rake bar extending outwardly in at least one direction from the rake-arm attachment point;
the rake bar comprising an elongated tine bar with a plurality of tines positioned along the length of said tine bar;
the plurality of tines extending outwardly from a rake bar side opposite the slide arm; and
the rake bar having a first push orientation where the tines pointing generally toward the rake-arm attachment point, and a second gather orientation where the tines point generally away from the rake-arm attachment point.

8. The apparatus of claim 7 further comprising:

the rake-arm attachment point comprising a pivot at which the rake bar may be pivoted with regard to the longitudinal axis of the slide arm; and a cant arm operationally linked to the rake bar such that movement of the slide arm along a length of the static arm imparts rotation of the rake bar at the pivot.

9. The apparatus of claim 7 further comprising:

the rake-arm attachment point comprising a pivot at which the rake bar may be pivoted;

the pivot comprising a pivot stator and a pivot rotor;

a cant lever extending outwardly from the pivot rotor and away from the slide arm;

a cant anchor fixedly attached to the static arm distal the pivot; and a cant arm having a fixed length, and operationally connectable between the cant anchor and the cant lever.

10. The apparatus of claim 8 wherein:

the rake bar may be pivoted 360 degrees.

* * * * *